(12) United States Patent
Kurita et al.

(10) Patent No.: US 10,668,950 B2
(45) Date of Patent: Jun. 2, 2020

(54) WHEEL BEARING DEVICE

(71) Applicant: NTN CORPORATION, Osaka (JP)

(72) Inventors: Masao Kurita, Shizuoka (JP);
Hirokazu Ohba, Shizuoka (JP)

(73) Assignee: NTN CORPORATION, Osaka (JP)

( * ) Notice: Subject to any disclaimer, the term of this patent is extended or adjusted under 35 U.S.C. 154(b) by 122 days.

(21) Appl. No.: 16/069,653

(22) PCT Filed: Jan. 16, 2017

(86) PCT No.: PCT/JP2017/001247
§ 371 (c)(1),
(2) Date: Jul. 12, 2018

(87) PCT Pub. No.: WO2017/126473
PCT Pub. Date: Jul. 27, 2017

(65) Prior Publication Data
US 2019/0016386 A1 Jan. 17, 2019

(30) Foreign Application Priority Data
Jan. 18, 2016 (JP) .................................. 2016-007095

(51) Int. Cl.
*B62D 17/00* (2006.01)
*B60B 35/14* (2006.01)
(Continued)

(52) U.S. Cl.
CPC .......... *B62D 17/00* (2013.01); *B60B 27/0036* (2013.01); *B60B 35/14* (2013.01);
(Continued)

(58) Field of Classification Search
CPC .. B62D 17/00; B62D 5/04; B62D 7/20; F16C 19/06; F16C 19/18; F16C 19/50;
(Continued)

(56) References Cited

U.S. PATENT DOCUMENTS 1,995,987 A * 3/1935 Keese .................. B60K 17/306
180/259
2,685,184 A 8/1954 Nador et al.
(Continued)

FOREIGN PATENT DOCUMENTS

DE 102012206337 10/2013
EP 1 754 649 2/2007
(Continued)

OTHER PUBLICATIONS

International Preliminary Report on Patentability dated Jul. 24, 2018 in International (PCT) Application No. PCT/JP2017/001247.
(Continued)

*Primary Examiner* — Laura Freedman
(74) *Attorney, Agent, or Firm* — Wenderoth, Lind & Ponack, L.L.P.

(57) ABSTRACT

A wheel bearing device includes a wheel bearing supported by a knuckle; a hub ring having a boss portion; a second constant-velocity joint; and a first constant-velocity joint. The second constant-velocity joint includes an outer ring rotatably supported by the wheel bearing, and an inner ring coupled to the boss portion of the hub ring. The first constant-velocity joint includes an outer ring coupled to the outer race of the second constant-velocity joint, and an inner ring coupled to a drive shaft. The knuckle supports a pair of camber angle-adjusting linear motion actuators, and a pair of toe angle-adjusting linear motion actuators.

8 Claims, 8 Drawing Sheets

(51) Int. Cl.
| | |
|---|---|
| *B60B 35/18* | (2006.01) |
| *F16C 33/64* | (2006.01) |
| *B62D 5/04* | (2006.01) |
| *F16C 19/54* | (2006.01) |
| *B62D 7/20* | (2006.01) |
| *B60G 7/00* | (2006.01) |
| *F16C 19/50* | (2006.01) |
| *B60B 35/16* | (2006.01) |
| *F16C 19/18* | (2006.01) |
| *F16C 23/04* | (2006.01) |
| *B60G 17/016* | (2006.01) |
| *B60B 27/00* | (2006.01) |
| *F16C 19/06* | (2006.01) |
| *F16C 33/58* | (2006.01) |
| *F16D 3/223* | (2011.01) |
| *F16H 25/22* | (2006.01) |
| *B60G 17/015* | (2006.01) |
| *F16H 25/20* | (2006.01) |

(52) U.S. Cl.
CPC ............. *B60B 35/16* (2013.01); *B60B 35/18* (2013.01); *B60G 7/00* (2013.01); *B60G 17/016* (2013.01); *B62D 5/04* (2013.01); *B62D 7/20* (2013.01); *F16C 19/06* (2013.01); *F16C 19/18* (2013.01); *F16C 19/50* (2013.01); *F16C 19/54* (2013.01); *F16C 23/04* (2013.01); *F16C 33/58* (2013.01); *F16C 33/64* (2013.01); *F16D 3/223* (2013.01); *F16H 25/2204* (2013.01); *B60G 17/015* (2013.01); *F16H 2025/2081* (2013.01)

(58) Field of Classification Search
CPC .......... F16C 19/54; F16C 23/04; F16C 33/58; F16C 33/64; B60G 7/00; B60G 17/015; B60G 17/016; B60B 27/0036; B60B 35/14; B60B 35/16; B60B 35/18; F16D 3/223; F16H 25/2204; F16H 2025/2081
See application file for complete search history.

(56) References Cited

U.S. PATENT DOCUMENTS

| | | | |
|---|---|---|---|
| 3,944,011 A | 3/1976 | Ernst et al. | |
| 4,010,986 A * | 3/1977 | Otto | B60B 27/0005 384/478 |
| 4,094,376 A * | 6/1978 | Welschof | F16D 3/845 180/254 |
| 4,877,103 A | 10/1989 | Nuutio | |
| 5,536,075 A * | 7/1996 | Bertetti | B60B 27/0005 180/254 |
| 5,538,273 A * | 7/1996 | Osenbaugh | B62D 17/00 280/86.756 |
| 5,700,025 A | 12/1997 | Lee | |
| 6,386,553 B2 * | 5/2002 | Zetterstrom | B60G 3/20 180/413 |
| 7,766,345 B2 * | 8/2010 | Hakui | B60G 7/006 280/5.521 |
| 8,066,292 B2 * | 11/2011 | Mueller | B60G 7/006 280/93.503 |
| 8,322,729 B2 * | 12/2012 | Michel | B60G 7/006 280/5.52 |
| 8,424,880 B2 * | 4/2013 | Horiguchi | B60G 7/006 280/5.521 |
| 8,474,837 B2 * | 7/2013 | Meitinger | B60G 7/006 280/5.521 |
| 8,894,077 B2 * | 11/2014 | Michel | B60G 7/006 280/5.52 |
| 2007/0080513 A1 * | 4/2007 | Osterlanger | B60G 3/26 280/86.751 |

FOREIGN PATENT DOCUMENTS

| | | |
|---|---|---|
| EP | 2 165 862 | 3/2010 |
| JP | 50-027204 | 3/1975 |
| JP | 09-507816 | 8/1997 |
| JP | 2006-10006 | 1/2006 |
| JP | 2009-132377 | 6/2009 |
| JP | 2009-173192 | 8/2009 |
| JP | 2009-243621 | 10/2009 |
| JP | 2010-127312 | 6/2010 |
| JP | 2013-159131 | 8/2013 |

OTHER PUBLICATIONS

Extended European Search Report dated Dec. 19, 2018 in European Application No. 17741351.5.

* cited by examiner

WHEEL BEARING DEVICE

TECHNICAL FIELD

The present invention relates to a wheel bearing device supporting a front wheel (drive wheel) of a vehicle.

BACKGROUND ART

In order to increase the travel stability of automobiles when they turn or travel in a straight line, the following automobiles are starting to be practically used: automobiles each including a mechanism configured to steer the rear wheels in accordance with the travel speed of the vehicle, and the movements of the steering angles of the front wheels, when the front wheels are steered by operating the steering wheel, or a mechanism configured to adjust the toe angles of the rear wheels.

For example, Japanese Unexamined Patent Application Publication No. 2009-173192 (hereinafter JP '192) discloses rear wheel steering devices configured to steer respective rear wheels in accordance with the steering angle of a steering wheel (steering angles of front wheels). The rear wheel steering devices of JP '192 each includes a toe control actuator connected to a knuckle supporting the corresponding one of the right and left rear wheels. The rear wheel steering devices control the respective knuckles independently of each other by the toe control actuators so as to steer the rear wheels in the same direction as or in the direction opposite to the steering angles of the front wheels, or control the toe angles of the rear wheels by shifting the steering angles of the rear wheels, so that the vehicle can stably turn or travel in a straight line.

The Japanese Unexamined Patent Application Publication No. 2013-159131 (hereinafter JP '131) discloses a rear wheel steering device configured to steer right and left rear wheels together. This rear wheel steering device includes a steering housing fixed to the vehicle body; a rear wheel steering shaft axially movably supported by the steering housing; a pair of tie rods coupled to the respective ends of the rear wheel steering shaft; and knuckle arms corresponding/coupled to the respective tie rods. By axially moving the rear wheel steering shaft, this rear wheel steering device can change the respective steering angles of the right and left rear wheels.

PRIOR ART DOCUMENTS

Patent Documents

Patent document 1: Japanese Unexamined Patent Application Publication No. 2009-173192
Patent document 2: Japanese Unexamined Patent Application Publication No. 2013-159131

SUMMARY OF THE INVENTION

Problems to be Solved by the Invention

The steering devices of JP '192 and JP '131 control the toe angles of the rear wheels (non-drive wheels) by controlling the knuckles, and JP '192 and JP '131 disclose nothing about adjusting the camber angles thereof. If only the toe angles are adjusted in this way, the forces causing the rear wheels to travel inwardly or outwardly act on the rear wheels, so that they might have an influence on the stable travel of the vehicle in a straight line. Therefore, measures need to be taken to enable the vehicle to stably travel in a straight line.

Generally, toe angle adjusting mechanisms for adjusting the toe angles of vehicle wheels are each configured to steer wheel bearing devices or knuckles through tie rods by an electric actuator or oil pressure, and control the toe angles of the vehicle wheels due to the change of the steering angles thereof. Since the wheel bearing devices are configured to change the steering angles together with the vehicle wheels, the structures thereof are complicated, and thus it takes time to assemble the wheel bearing devices. Therefore, measures need to be taken to assemble the wheel bearing devices easily.

It is an object of the present invention to provide a wheel bearing device capable of being assembled easily, and adjusting a toe angle and a camber angle.

Means for Solving the Problems

In order to achieve the above object, the present invention provides a wheel bearing device comprising: a wheel body of a wheel of a vehicle; a wheel bearing supported by a knuckle of the vehicle; a hub ring including a disk portion coupled to the wheel body, and a boss portion disposed on a center axis of the disk portion; a first constant-velocity joint and a second constant-velocity joint that are mounted between opposed portions of the boss portion and a drive shaft; a pair of camber angle-adjusting linear motion actuators configured to press upper and lower portions of an inboard side surface of the disk portion, respectively so as to adjust a camber angle of the wheel; and a pair of toe angle-adjusting linear motion actuators configured to press, respectively, front and rear portions, in a vehicle travel direction in which the vehicle travels, of the inboard side surface of the disk portion so as to adjust a toe angle of the wheel. Each of the first and second constant-velocity joints comprises a fixed constant-velocity joint including: an outer ring having a spherical inner surface having track grooves; an inner ring having a spherical outer surface having track grooves; a cage disposed between the spherical inner surface of the outer ring and the spherical outer surface of the inner ring; and balls retained by the cage so as to be capable of rolling along the respective ones of the track grooves in the spherical inner surface of the outer ring and the respective ones of the track grooves in the spherical outer surface of the inner ring. The inner ring of the first constant-velocity joint is coupled to the drive shaft, and the outer ring of the first constant-velocity joint is coupled to the outer ring of the second constant-velocity joint. The outer ring of the second constant-velocity joint is rotatably supported by the wheel bearing, and the inner ring of the second constant-velocity joint is coupled to the boss portion of the hub ring. The pair of camber angle-adjusting linear motion actuators, and the pair of toe angle-adjusting linear motion actuators are supported by the knuckle.

The above-described wheel bearing device is used for each wheel, and in order to adjust the camber angle of each wheel, one of the camber angle-adjusting linear motion actuators is activated, and presses the upper or lower portion of the disk portion of the hub ring such that the wheel forms a negative camber angle, at which the ground contact point of the tire surface of the wheel is located outwardly of the center axis of the wheel, or the wheel forms a positive camber angle, at which the ground contact point of the tire surface of the wheel is located inwardly of the center axis of the wheel.

Also, by activating one of the toe angle-adjusting the linear motion actuators, which are disposed in the front and rear portions of the wheel bearing device in the vehicle travel direction, the one toe angle-adjusting the linear motion actuator presses the front or rear portion, in the vehicle travel direction, of the disk portion of the hub ring such that the toe angle of the wheel is adjusted to a "toe-out" state, in which the wheel is inclined outwardly in the vehicle travel direction, or a "toe-in" state, in which the wheel is inclined inwardly in the vehicle travel direction.

When the camber angle and the toe angle of the wheel are adjusted as described above, the outer and inner rings of the second constant-velocity joint are inclined relative to each other, and rotate at a constant velocity in this inclined state, so that the rotation of the inner ring is transmitted to the wheel through the hub ring.

It is preferable that the wheel bearing device further comprises a raceway ring having an opposed surface opposed to the inboard side surface of the disk portion of the hub ring, and configured to receive axial loads of the camber angle-adjusting linear motion actuators, and axial loads of the toe angle-adjusting linear motion actuators, the raceway ring has a first circular raceway groove in the opposed surface of the raceway ring, the disk portion of the hub ring has a second circular raceway groove in a portion of the inboard side surface of the disk portion that is opposed to the opposed surface of the raceway ring, each of the first and second circular raceway grooves has a center on a center axis of the hub ring, and the wheel bearing device further comprises balls disposed between the first and second circular raceway grooves so as to rotatably support the raceway ring.

By, as described above, mounting a raceway ring to the disk portion of the hub ring through the balls such that the raceway ring is rotatable relative to the disk portion; and applying to the raceway ring the axial forces of the camber angle-adjusting linear motion actuators and the toe angle-adjusting linear motion actuators, it is possible to markedly reduce the rotational resistance applied to the hub ring, and thus to rotate the wheel in a smooth manner, compared to the arrangement in which the hub ring is pressed directly by such linear motion actuators.

It is preferable that the wheel bearing device further comprises a spherical seat plate having a convex spherical surface on an outer periphery of the spherical seat plate, and coupled to an open end surface of the outer ring of the second constant-velocity joint, and that the disk portion of the hub ring has a concave spherical surface configured to guide the convex spherical surface of the spherical seat plate while kept in contact with the convex spherical surface.

By, as described above, coupling a spherical seat plate to the open end surface of the outer ring of the second constant-velocity joint, and bringing the convex spherical surface of the spherical seat plate into contact with the concave spherical surface of the disk portion of the hub ring, the convex spherical surface of the spherical seat plate can support the unbalanced load applied from the hub ring when inclined together with the wheel. Therefore, it is possible to equalize the loads applied to the respective balls of the second constant-velocity joint, and thus to activate the second constant velocity joint in a smooth manner.

It is preferable that each of the camber angle-adjusting linear motion actuators, and the toe angle-adjusting linear motion actuators comprises an electric ball screw assembly constituted by: an electric motor; and a ball screw including a nut, balls, and a threaded shaft threadedly engaged with the nut through the balls of the ball screw, the ball screw being configured to be driven by the electric motor, and that the electric ball screw assemblies are each configured such that when the nut is driven by the electric motor, the threaded shaft is axially moved so as to apply an axial load to the disk portion of the hub ring.

If each of the camber angle-adjusting linear motion actuators, and the toe angle-adjusting linear motion actuators comprises an electric ball screw assembly, it is possible to reduce the rotational resistance of the nut, and thus to axially move the threaded shaft in a smooth manner.

Effects of the Invention

In the wheel bearing device of the present invention, as described above, the fixed first and second constant-velocity joints are mounted between the derive shaft and the hub ring coupled to the wheel body of the wheel; the inner ring of the first constant-velocity joint is coupled to the drive shaft; the outer ring of the first constant-velocity joint is coupled to the outer ring of the second constant-velocity joint; the outer ring of the second constant-velocity joint is rotatably supported by the wheel bearing supported by the knuckle; the inner ring of the second constant-velocity joint is coupled to the boss portion of the hub ring; and the knuckle supports the pair of camber angle-adjusting linear motion actuators configured to press the upper and lower portions of the inboard side surface of the disk portion, respectively, and the pair of toe angle-adjusting linear motion actuators configured to press, respectively, the front and rear portions, in the vehicle travel direction, of the inboard side surface of the disk portion, so that the camber and toe angles of the wheel can be adjusted by activating the camber angle-adjusting and toe angle-adjusting linear motion actuators.

By adjusting the toe angle of each wheel to a "toe-out" state, when the camber angle of each wheel is adjusted such that the wheel forms a negative camber angle, at which the ground contact point of the tire surface of the wheel is located outwardly of the center axis of the wheel, or by adjusting the toe angle of each wheel to a "toe-in" state, when the camber angle of each wheel is adjusted such that the wheel forms a positive camber angle at which the ground contact point of the tire surface of the wheel is located inwardly of the center axis of the wheel, it is possible to apply to the wheel the force against the force inclining the wheel in the vehicle travel direction, so that the vehicle can stably travel in a straight line.

Also, the wheel bearing supported by the knuckle, the second constant-velocity joint supported by the wheel bearing, and the hub ring form a single unit, and the outer ring of the second constant-velocity joint is coupled to the outer ring of the first constant-velocity joint. Therefore, the single unit can be mounted to, and separated from, the wheel bearing device, and thus the wheel bearing device can be assembled easily. Also, even if a part or parts of the unit are damaged, the damaged part(s) can be easily replaced with a new one(s).

DETAILED DESCRIPTION OF THE INVENTION

Figure 1:
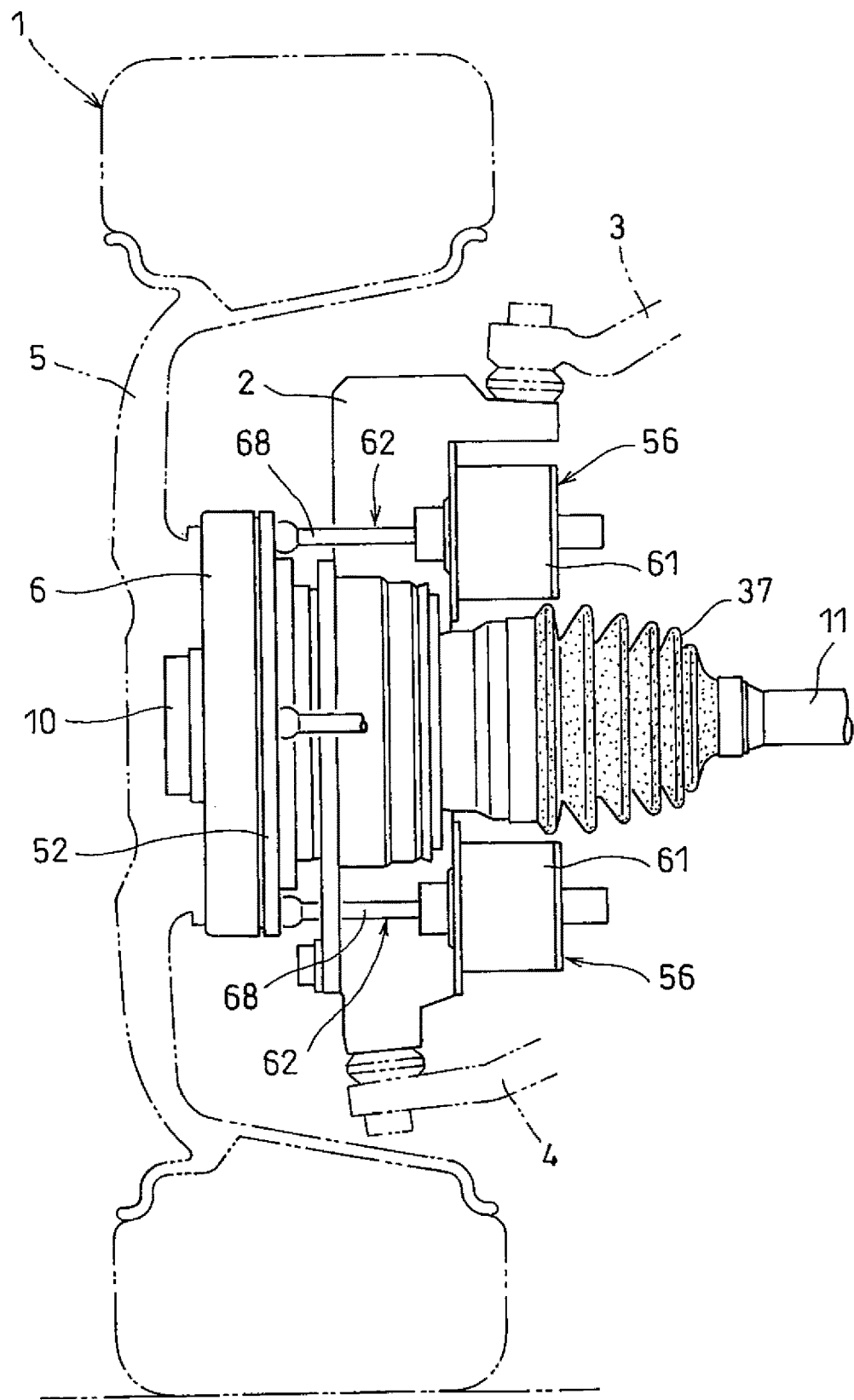
FIG. 1 is a front view of a wheel bearing device embodying the present invention.

A wheel bearing device embodying the present invention is now described with reference to the drawings. As illustrated in FIG. 1, upper and lower arms 3 and 4 are connected to a knuckle 2 supporting a front wheel 1 as a drive wheel, and couple the knuckle 2 to the vehicle body.

Figure 2:
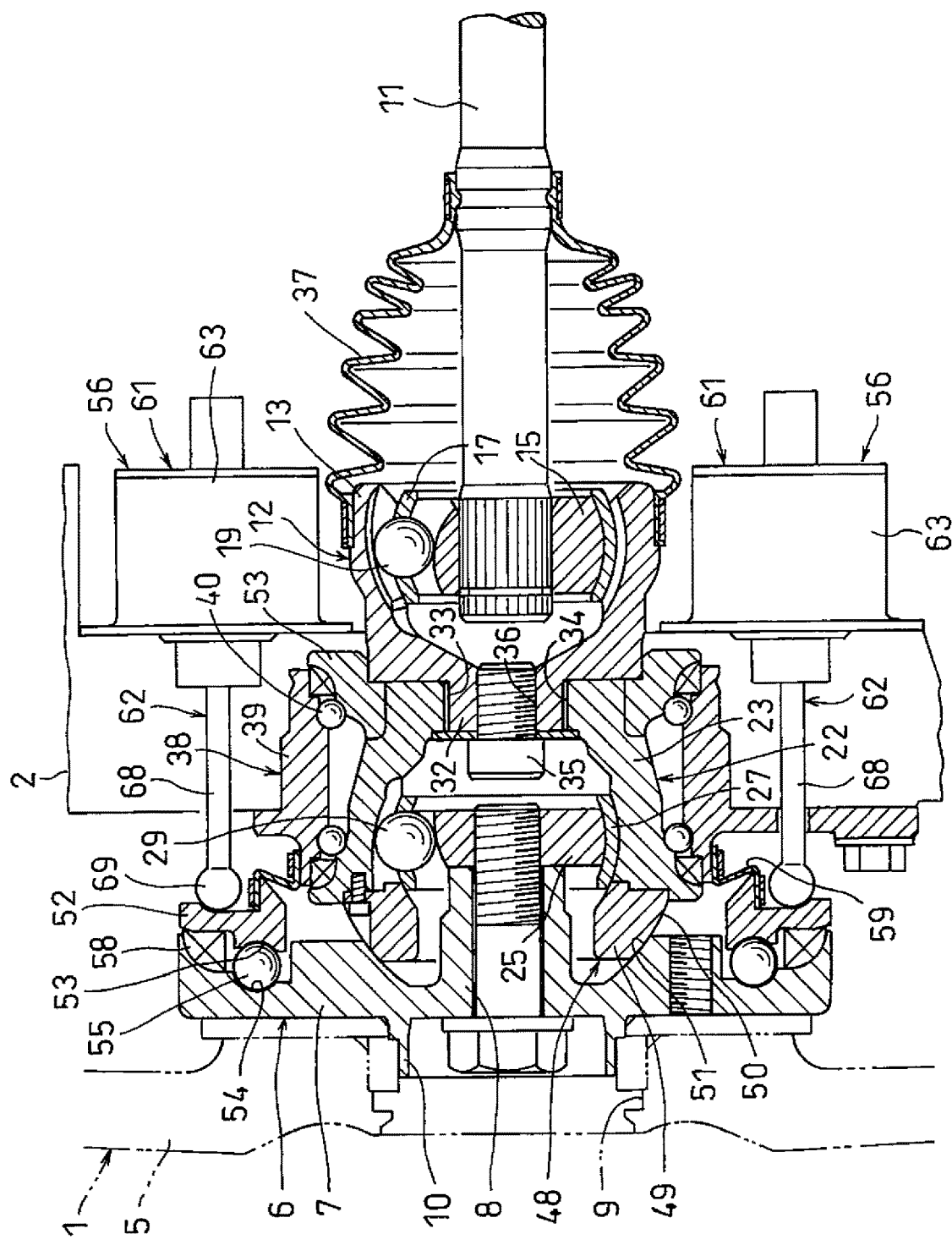
FIG. 2 is a vertical sectional view of the wheel bearing device of FIG. 1.

As illustrated in FIG. 2, a hub ring 6 is mounted to the wheel body 5 of the front wheel 1, and includes a disk portion 7; a tubular boss portion 8 disposed at the central portion of the disk portion 7 on its inboard side surface; and a pilot portion 10 disposed on the outboard side surface of the disk portion 7, and press-fitted in a central hole 9 in the wheel body 5.

The term "inboard" means closer to the center of the vehicle with the hub ring 6 mounted to the wheel body 5, whereas the term "outboard" means remoter from the center of the vehicle.

A first constant-velocity joint 12 and a second constant-velocity joint 22 are mounted between the hub ring 6 and a drive shaft 11 for driving the front wheel 1.

Figure 4:
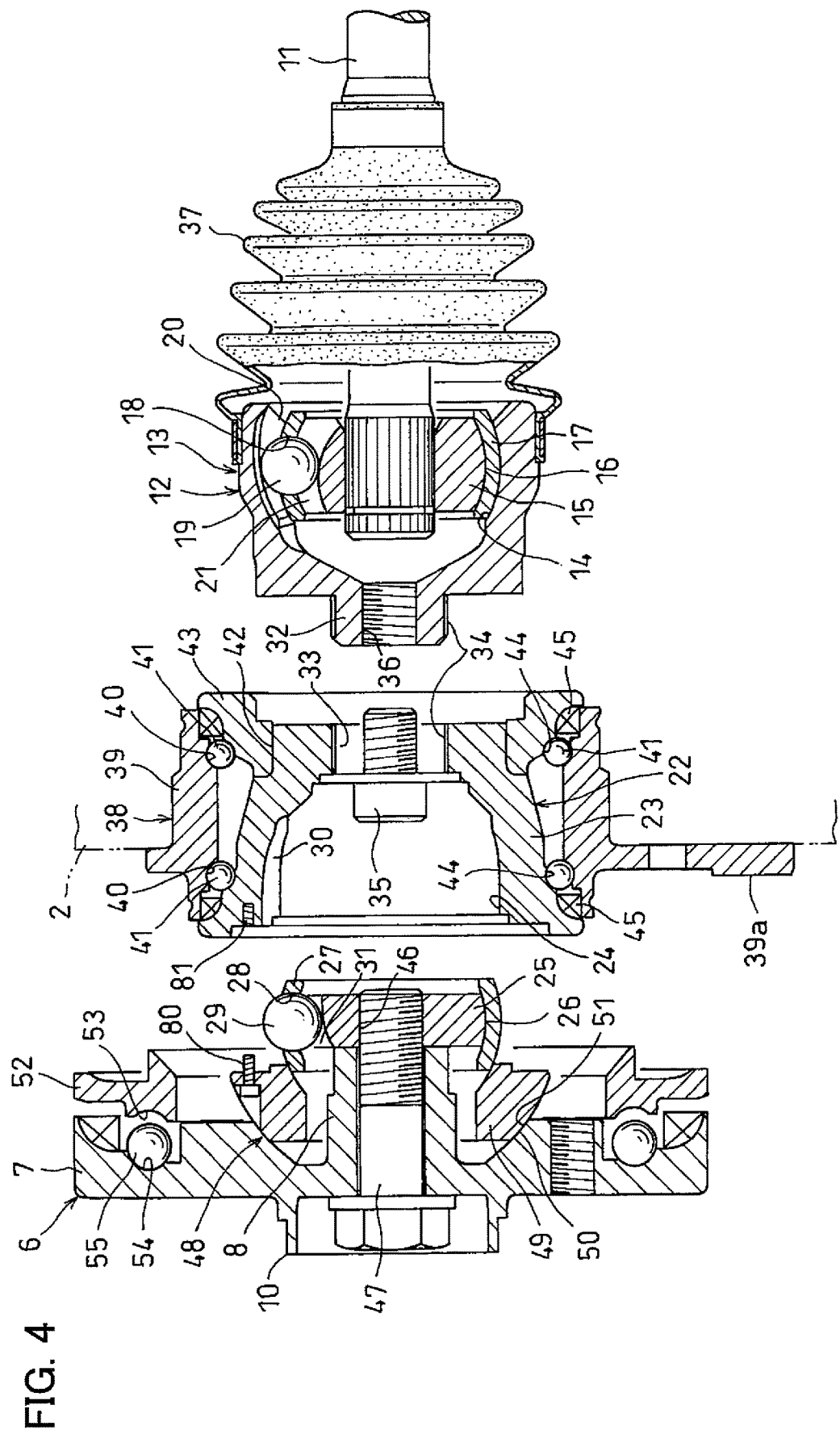
FIG. 4 is a sectional view of the wheel bearing device with some parts thereof disassembled.

As illustrated in FIG. 4, the first constant-velocity joint 12 comprises a fixed, constant-velocity ball joint including an outer ring 13 having a spherical inner surface 14; an inner ring 15 disposed inwardly of the spherical inner surface 14, and having an spherical outer surface 16; a cage 17 mounted between the spherical inner surface 14 of the outer ring 13 and the spherical outer surface 16 of the inner ring 15; and balls 19 received in respective pockets 18 in the cage 17 that are circumferentially equidistantly spaced apart from each other such that the balls 19 are capable of rolling along track grooves 20 in the spherical inner surface 14 of the outer race 13 and track grooves 21 in the spherical outer surface 16 of the inner ring 15. In this constant-velocity ball joint, the curvature center of the track grooves 20 of the outer race 13, and the curvature center of the track grooves 21 of the inner race 15 are equidistantly offset from the center of the joint in the right and left directions so that, even when the axes of the outer and inner rings 13 and 15 form an angle, the constant-velocity ball joint can transmit rotation at a constant velocity.

The second constant-velocity joint 22 also comprises, as with the first constant-velocity joint 12, a fixed, constant-velocity ball joint, and includes an outer ring 23 having a spherical inner surface 24; an inner ring 25 disposed inwardly of the spherical inner surface 24, and having an spherical outer surface 26; a cage 27 mounted between the spherical inner surface 24 of the outer ring 23 and the spherical outer surface 26 of the inner ring 25; and balls 29 received in respective pockets 28 in the cage 27 that are circumferentially equidistantly spaced apart from each other such that the balls 29 are capable of rolling along track grooves 30 in the spherical inner surface 24 of the outer race 23 and track grooves 31 in the spherical outer surface 26 of the inner ring 25.

The inner ring 15 of the first constant-velocity joint 12 is fitted to one end of the drive shaft 11 through serrations so as to be rotationally fixed to the drive shaft 11.

As illustrated in FIG. 2, the outer ring 13 of the first constant-velocity joint 12 is arranged coaxially with, and coupled to, the outer ring 23 of the second constant-velocity joint 22 with the closed end of the outer ring 13 opposed to the closed end of the outer ring 23. Specifically, the outer ring 13 of the first constant-velocity joint 12 has, on the closed end thereof, a stem 32 with serration teeth 34 that is fitted into a stem inserting hole 33 with serration teeth 34 that is formed in the closed end of the outer ring 23 of the second constant-velocity joint 22 such that the outer rings 13 and 23 are coupled together so as to be rotationally fixed relative to each other due to meshing engagement between the serration teeth 34 of the stem 32 and the serration teeth 34 of the stem inserting hole 33. A bolt 35 with a washer is inserted from the open end of the outer ring 23 of the second constant-velocity joint 22, screwed into a threaded hole 36 formed in the stem 32 to extend along its center axis, and tightened, to couple the outer rings 13 and 23 to each other.

A boot 37 is mounted to the drive shaft 11 and the outer ring 13 of the first constant-velocity joint 12 so as to close the end opening of the outer ring 13, thereby preventing the grease contained in the outer ring 13 from leaking out, and also preventing foreign matter from entering the outer ring 13.

As illustrated in FIG. 4, the outer ring 23 of the second constant-velocity joint 22 is rotatably supported by a wheel bearing 38 supported by the knuckle 2. The wheel bearing 38 includes a bearing outer race 39 having a flange 39a on its outer periphery that is screwed to the knuckle 2; and balls 41 capable of rolling along double-row raceway grooves 40 formed in the inner periphery of the bearing outer race 39. The wheel bearing 38 further includes a bearing inner race, 43 fitted on, and fixed to, a bearing support surface 42 formed on the closed end of the outer ring 23 of the second constant-velocity joint 22. The outer ring 23 is supported by the wheel bearing 38 with the balls 40 in the respective rows received in, so as to be capable of rolling along, a raceway groove 44 in the outer periphery of the bearing inner race 43, and a raceway groove 44 in the outer periphery of the outer ring 23 near its open end.

Both open ends of the bearing outer race 39 are sealed by seal members 45 mounted, respectively, between the bearing outer race 39 and the outer ring 23 of the second constant-velocity joint 22, and between the bearing outer race 39 and the bearing inner race 43, so that the grease contained in the bearing outer race 39 is prevented from leaking out, and also foreign matter is prevented from entering the bearing outer race 39.

The inner ring 25 of the second constant-velocity joint 22 is brought into abutment with the end surface of the boss portion 8 of the hub ring 6, and coupled to the boss portion 8. More specifically, a bolt 47 is inserted through the boss portion 8 from the outboard side of the hub ring 6, threadedly engaged in a threaded hole 46 formed in the inner ring 25 to extend along its center axis, and tightened, to fix the inner ring 25 in position.

As illustrated in FIG. 2, an aligning mechanism 48 is disposed between the opposed portions of the hub ring 6 and the outer ring 23 of the second constant-velocity joint 22 so as to prevent an unbalanced load from being applied to the balls 29 of the second constant-velocity joint 22 from the hub ring 6.

The aligning mechanism 48 includes a spherical seat plate 49 screwed to the open end surface of the outer ring 23. The spherical seat plate 49 has a convex spherical surface 50 on its outer periphery that is kept in contact with a concave spherical surface 51 formed on the disk portion 7 of the hub ring 6 such that, when the hub ring 6 and the inner ring 25 rotate with their axes forming an angle, the concave spherical surface 51 of the hub ring 6 is guided by the convex spherical surface 50 of the spherical seat plate 49 while kept in contact with the convex spherical surface 50, and the convex spherical surface 50 receives an unbalanced load from the hub ring 6, thereby preventing an unbalanced load from being applied to the balls 29.

A raceway ring 52 is disposed at a position opposed to the radially outer portion of the disk portion 7 on its inboard side. Circular raceway grooves 53 and 54 each having a center on the center axis of the hub ring 6 are formed in the opposed surfaces of the raceway ring 52 and the disk portion 7, respectively. Balls 55 are disposed between the raceway grooves 53 and 54 such that the raceway ring 52 and the hub ring 6 are rotatable relative to each other.

Figure 5:
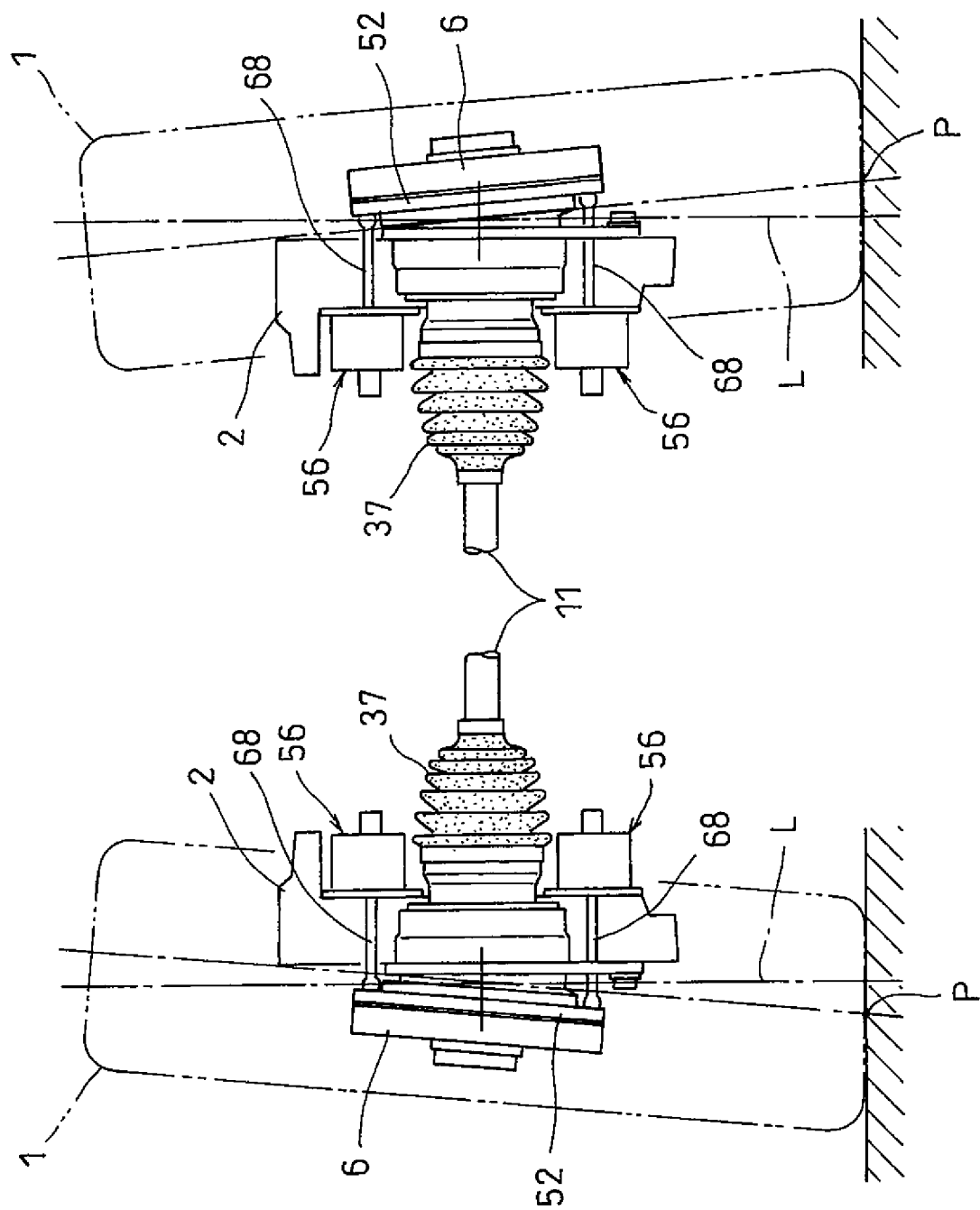
FIG. 5 is a schematic front view illustrating the negative camber state of wheels.
Figure 6:
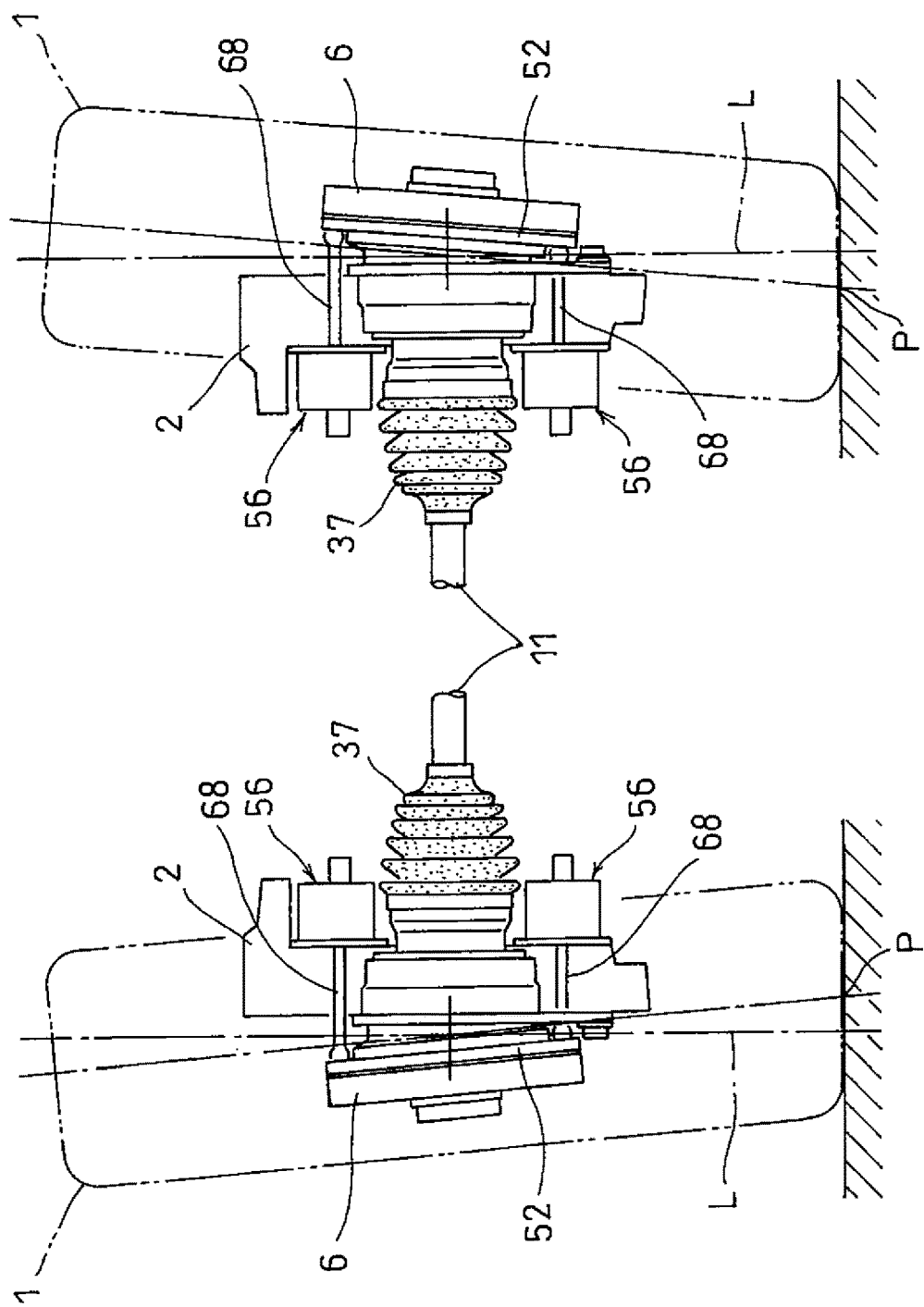
FIG. 6 is a schematic front view illustrating the positive camber state of the wheels.
Figure 7:
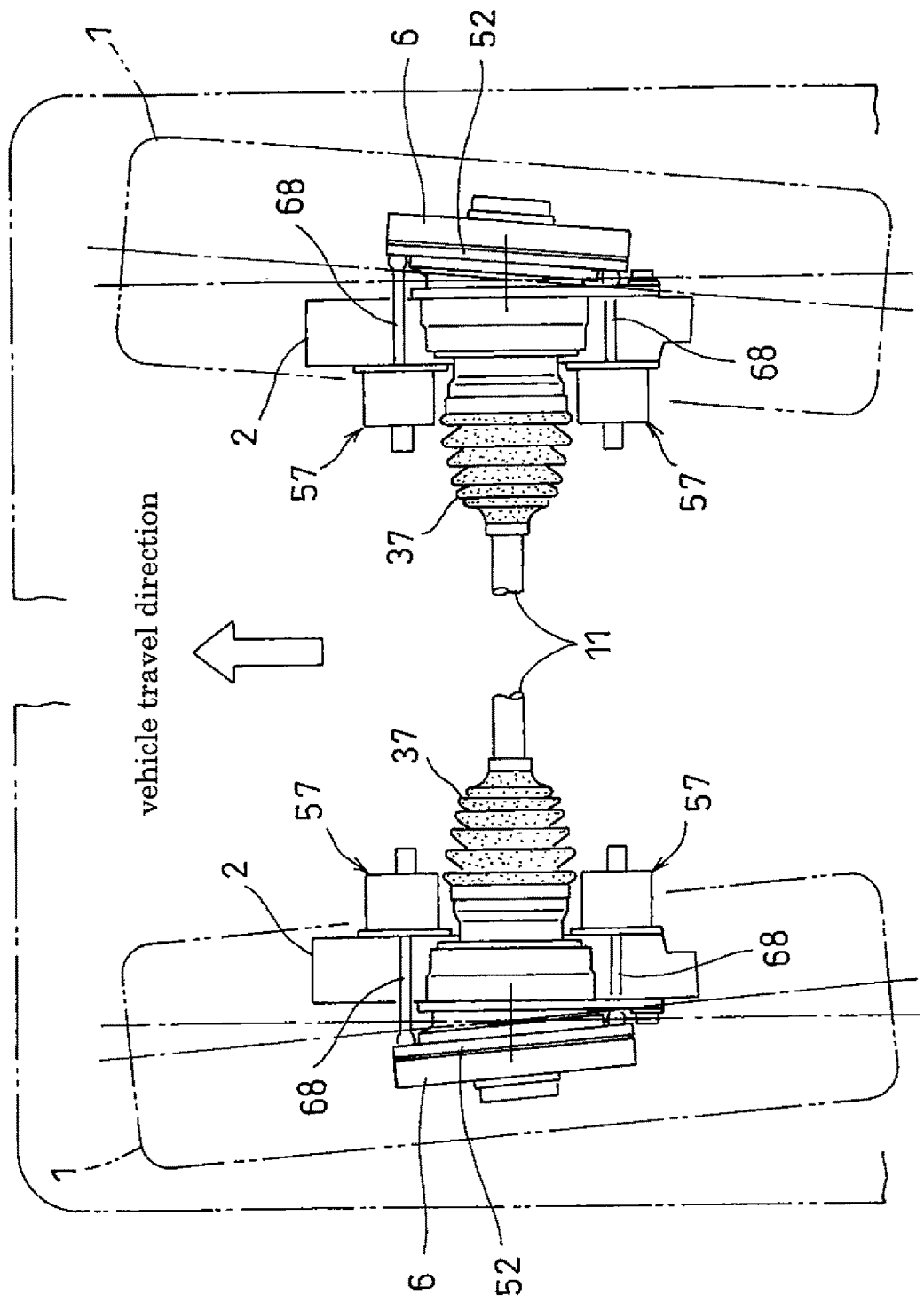
FIG. 7 is a schematic front view illustrating the "toe-out" state of the wheels.
Figure 8:
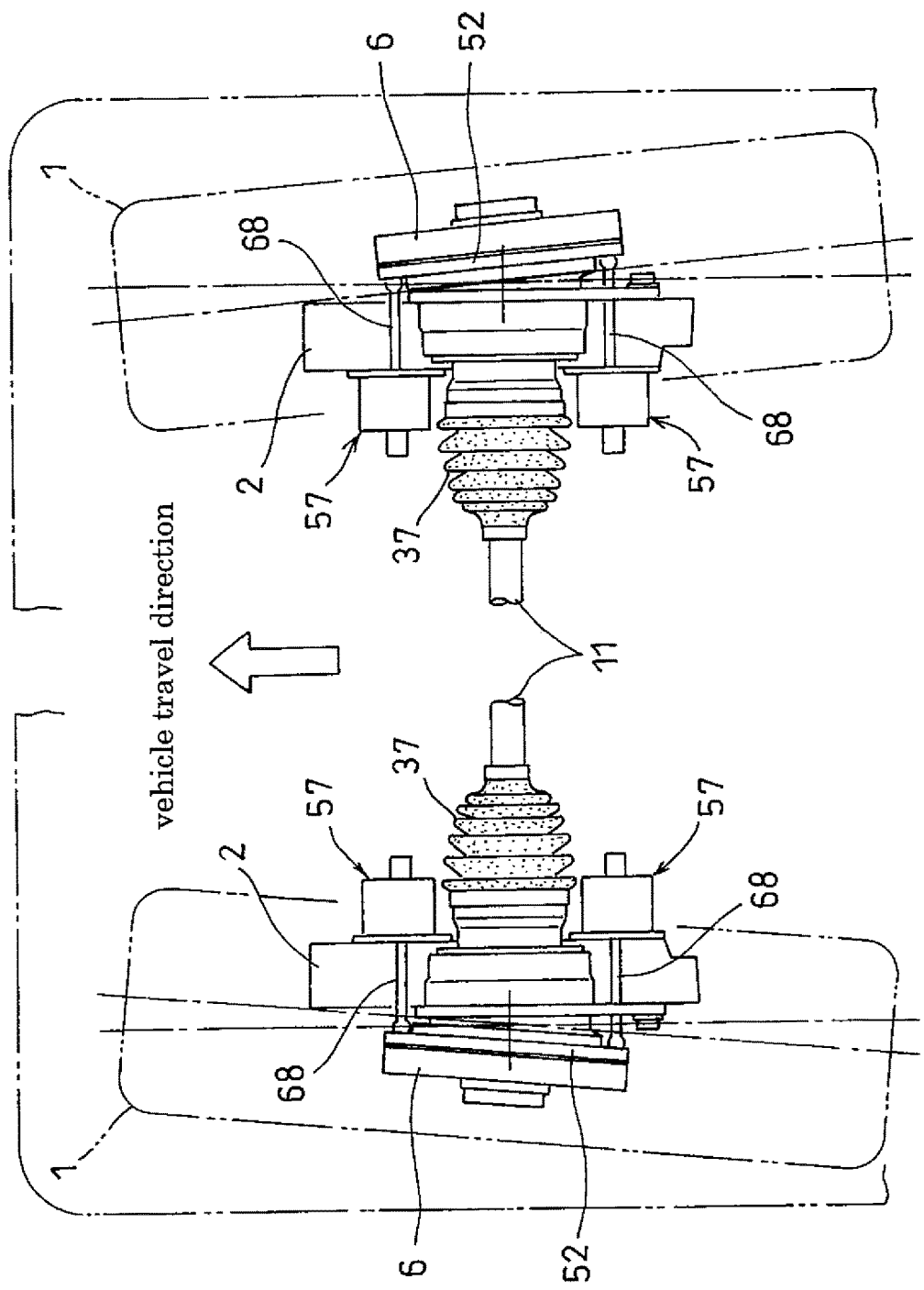
FIG. 8 is a schematic front view illustrating the "toe-in" state of the wheels.

As illustrated in FIGS. 5 and 6, the knuckle 2 supports a pair of upper and lower camber angle-adjusting linear motion actuators 56 configured to adjust the camber angle of the drive wheel 1 (which is a front wheel 1) by pressing the upper and lower portions of the inboard side surface of the raceway ring 52, respectively. As illustrated in FIGS. 7 and 8, the knuckle 2 also supports a pair of toe angle-adjusting linear motion actuators 57 configured to adjust the toe angle of the front wheel 1 by pressing, respectively, the front and rear portions, in the vehicle travel direction, of the inboard side surface of the raceway ring 52.

Figure 3:
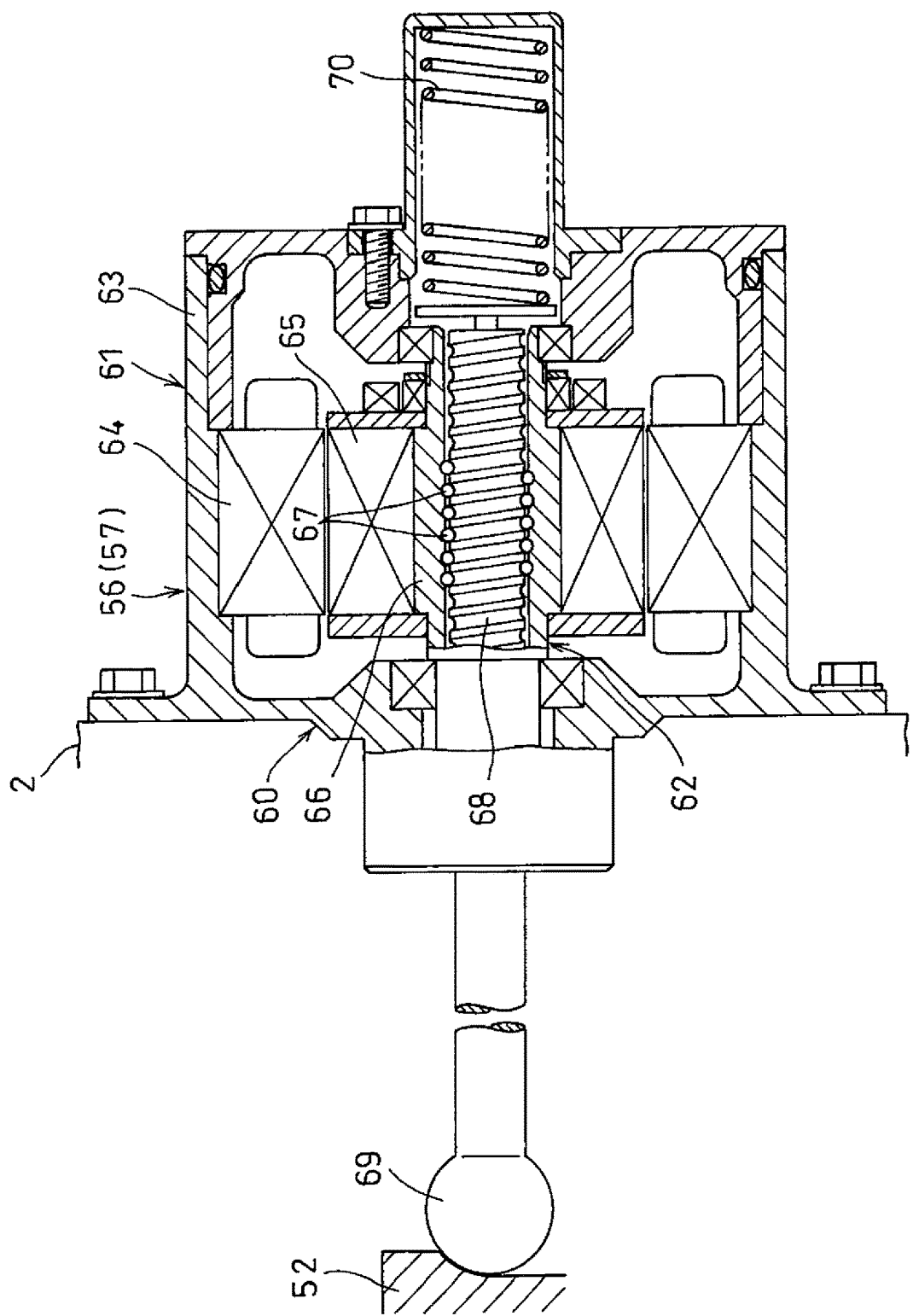
FIG. 3 is a vertical sectional view of each linear motion actuator of FIG. 2.

In the embodiment, each of the camber angle-adjusting linear motion actuators 56 and the toe angle-adjusting linear motion actuators 57 comprises an electric ball screw assembly 60 (shown in FIG. 3) constituted by an electric motor 61, and a ball screw 62 configured to be driven by the electric motor 61.

The electric motor 61 comprises a motor case 63 screwed to the knuckle 2; a stator 64 supported by the inner diameter surface of the motor case 63; and a rotor 65 mounted inside of the stator 64. The ball screw 62 comprises a nut 66 mounted inside of the rotor 65 of the electric motor 61; balls 67; and a threaded shaft 68 including a spherical presser 69 at its distal end, and threadedly engaged with the nut 66 through the balls 67. The ball screw 62 is configured such that when the nut 66 is rotated by the electric motor 61, and the threaded shaft 68 is axially moved, the presser 69 at the distal end of the threaded shaft 68 presses the raceway ring 52.

In order to smoothly move the threaded shaft 68 toward the raceway ring 52, the threaded shaft 68 is biased toward the raceway ring 52 by an elastic member 70.

As illustrated in FIG. 2, a seal member 58 is mounted between the outer peripheral portions of the opposed surfaces of the raceway ring 52 and the disk portion 7 of the hub ring 6, thereby preventing grease from leaking out. A boot 59 closes the space between the raceway ring 52 and the bearing outer race 39, thereby preventing the leakage of grease, and the entry of foreign matter.

The above-described wheel bearing device according to the embodiment is used for each of the front wheels (drive wheels 1), and in order to adjust the camber angle of each front wheel, one of the pair of camber angle-adjusting linear motion actuators 56 (shown in FIG. 1) is activated. For example, when the lower one of the camber angle-adjusting linear motion actuators 56 is activated to move its threaded shaft 68 toward the raceway ring 52, the threaded shaft 68 presses the lower portion of the raceway ring 52 so that, as illustrated in FIG. 5, the front wheel 1 is inclined to form a negative camber angle, at which the shown ground contact point P of the tire surface of the front wheel is located outwardly of the shown center axis L of the front wheel.

On the other hand, when the upper one of the camber angle-adjusting linear motion actuators 56 (shown in FIG. 1) is activated to move its threaded shaft 68 toward the raceway ring 52, the threaded shaft 68 presses the upper portion of the raceway ring 52 so that, as illustrated in FIG. 6, the front wheel 1 is inclined to form a positive camber angle, at which the shown ground contact point P of the tire surface is located inwardly of the shown center axis L.

When the front one of the pairs of toe angle-adjusting linear motion actuators 57 is activated, its threaded shaft 68 presses the front portion, in the vehicle travel direction, of the raceway ring 52, thereby adjusting the toe angle of the front wheel 1 to a "toe-out" state, in which the front portion, in the vehicle travel direction, of the front wheel is inclined outwardly.

On the other hand, when the rear one of the toe angle-adjusting linear motion actuators 57 is activated, its threaded shaft 68 presses the rear portion, in the vehicle travel direction, of the raceway ring 52, thereby adjusting the toe angle of the front wheel 1 to a "toe-in" state, in which the front portion, in the vehicle travel direction, of the front wheel is inclined inwardly.

When the camber angle and the toe angle are adjusted as described above, the outer and inner rings 23 and 25 of the second constant-velocity joint 22 are inclined relative to each other, and rotate at a constant velocity in this inclined state, so that the rotation of the inner ring 25 is transmitted to the front wheel 1 through the hub ring 6.

When each front wheel 1 forms a negative camber angle as illustrated in FIG. 5, a force causing the front wheel 1 to move inwardly in the vehicle travel direction acts on the front wheel 1. In this case, by, as illustrated in FIG. 7, adjusting the toe angle of each front wheel 1 such that the front wheel 1 is in the "toe-out" state, a force causing the front wheel 1 to move outwardly in the vehicle travel direction acts on the front wheel 1, thereby offsetting the force applied to the front wheel 1 due to the negative camber angle. As a result thereof, the vehicle can stably travel in a straight line.

When each front wheel 1 forms a positive camber angle as illustrated in FIG. 6, a force causing the front wheel 1 to move outwardly in the vehicle travel direction acts on the front wheel 1. In this case, by, as illustrated in FIG. 8, adjusting the toe angle of each front wheel 1 such that the front wheel 1 is in the "toe-in" state, a force causing the front wheel 1 to move inwardly in the vehicle travel direction acts on the front wheel 1, thereby offsetting the force applied to the front wheel 1 due to the positive camber angle. As a result thereof, the vehicle can stably travel in a straight line.

By, as illustrated in FIG. 2, pressing the raceway ring 52, which is supported by the hub ring 6 through the balls 55 so as to be rotatable relative to the hub ring 6, by use of the threaded shafts 68 of the camber angle-adjusting linear motion actuators 56 and the toe angle-adjusting linear motion actuators 57, it is possible to markedly reduce the rotational resistance applied to the hub ring 6, and thus to rotate the front wheel 1 in a smooth manner, compared to the arrangement in which the hub ring 6 is pressed directly by the linear motion actuators 56 and 57.

In the exploded front view of FIG. 4, the hub ring 6, the spherical seat plate 49, the second constant-velocity joint 22, and the wheel bearing 38 form a single unit by screwing bolts 80 mounted to the spherical seat plate 49 into threaded holes 81 formed in the open end surface of the outer ring 23, and tightening the bolts 80, and the single unit can be mounted to, and separated from, the wheel bearing device. Therefore, the wheel bearing device can be assembled easily, and even if a part or parts of the unit are damaged, the damaged part(s) can be easily replaced with a new one(s).

While the wheel bearing device supports a front wheel 1 in the embodiment, the wheel bearing device may be used to support a rear wheel.

DESCRIPTION OF REFERENCE NUMERALS

1: front wheel (vehicle wheel)
2: knuckle
5: wheel body
6: hub ring
7: disk portion
8: boss portion
11: drive shaft
12: first constant-velocity joint
13, 23: outer ring
14, 24: spherical inner surface
15, 25: inner ring
16, 26: spherical outer surface
17, 27: cage
19, 29: ball
20, 21, 30, 31: track groove
22: second constant-velocity joint
38: wheel bearing
49: spherical seat plate
50: convex spherical surface
51: concave spherical surface
52: raceway ring
53, 54: raceway groove
55: ball
56: camber angle-adjusting linear motion actuator
57: toe angle-adjusting linear motion actuator
61: electric motor
62: ball screw
66: nut
68: threaded shaft

The invention claimed is:

1. A wheel bearing device comprising:
a wheel body of a wheel of a vehicle;
a wheel bearing to be supported by a knuckle of the vehicle;
a hub ring including a disk portion coupled to the wheel body, and a boss portion disposed on a center axis of the disk portion;
a first constant-velocity joint and a second constant-velocity joint mounted between opposed portions of the boss portion and a drive shaft;
a pair of camber angle-adjusting linear motion actuators configured to press upper and lower portions of an inboard side surface of the disk portion, respectively, so as to adjust a camber angle of the wheel; and
a pair of toe angle-adjusting linear motion actuators configured to press, respectively, front and rear portions, in a vehicle travel direction in which the vehicle travels, of the inboard side surface of the disk portion so as to adjust a toe angle of the wheel,
wherein each of the first and second constant-velocity joints comprises a fixed constant-velocity joint including:
an outer ring having a spherical inner surface having track grooves;
an inner ring having a spherical outer surface having track grooves;
a cage disposed between the spherical inner surface of the outer ring and the spherical outer surface of the inner ring; and
balls retained by the cage so as to each roll along a respective one of the track grooves in the spherical inner surface of the outer ring and a respective one of the track grooves in the spherical outer surface of the inner ring,
wherein the inner ring of the first constant-velocity joint is to be coupled to the drive shaft, and the outer ring of the first constant-velocity joint is coupled to the outer ring of the second constant-velocity joint,
wherein the outer ring of the second constant-velocity joint is rotatably supported by the wheel bearing, and the inner ring of the second constant-velocity joint is coupled to the boss portion of the hub ring, and
wherein the pair of camber angle-adjusting linear motion actuators, and the pair of toe angle-adjusting linear motion actuators are to be supported by the knuckle.

2. The wheel bearing device according to claim 1, further comprising:
a raceway ring having an opposed surface opposed to the inboard side surface of the disk portion of the hub ring, and configured to receive axial loads of the camber angle-adjusting linear motion actuators, and axial loads of the toe angle-adjusting linear motion actuators,
wherein the raceway ring has a first circular raceway groove in the opposed surface of the raceway ring, and the disk portion of the hub ring has a second circular raceway groove in a portion of the inboard side surface of the disk portion opposed to the opposed surface of the raceway ring, and
wherein each of the first and second circular raceway grooves has a center on a center axis of the hub ring; and
balls disposed between the first and second circular raceway grooves so as to rotatably support the raceway ring.

3. The wheel bearing device according to claim 2, further comprising a spherical seat plate having a convex spherical surface on an outer periphery of the spherical seat plate, and coupled to an open end surface of the outer ring of the second constant-velocity joint,
wherein the disk portion of the hub ring has a concave spherical surface configured to guide the convex spherical surface of the spherical seat plate while kept in contact with the convex spherical surface.

4. The wheel bearing device according to claim 3, wherein each of the camber angle-adjusting linear motion actuators, and the toe angle-adjusting linear motion actuators comprises an electric ball screw assembly including:
an electric motor; and
a ball screw including a nut, balls, and a threaded shaft threadedly engaged with the nut through the balls of the ball screw, the ball screw being configured to be driven by the electric motor, and
wherein the electric ball screw assemblies are each configured such that when the nut is driven by the electric motor, the threaded shaft is axially moved so as to apply an axial load to the disk portion of the hub ring.

5. The wheel bearing device according to claim 2, wherein each of the camber angle-adjusting linear motion actuators, and the toe angle-adjusting linear motion actuators comprises an electric ball screw assembly including:

an electric motor; and a ball screw including a nut, balls, and a threaded shaft threadedly engaged with the nut through the balls of the ball screw, the ball screw being configured to be driven by the electric motor, and wherein the electric ball screw assemblies are each configured such that when the nut is driven by the electric motor, the threaded shaft is axially moved so as to apply an axial load to the disk portion of the hub ring.

6. The wheel bearing device according to claim 1, further comprising a spherical seat plate having a convex spherical surface on an outer periphery of the spherical seat plate, and coupled to an open end surface of the outer ring of the second constant-velocity joint, wherein the disk portion of the hub ring has a concave spherical surface configured to guide the convex spherical surface of the spherical seat plate while kept in contact with the convex spherical surface.

7. The wheel bearing device according to claim 6, wherein each of the camber angle-adjusting linear motion actuators, and the toe angle-adjusting linear motion actuators comprises an electric ball screw assembly including:

an electric motor; and a ball screw including a nut, balls, and a threaded shaft threadedly engaged with the nut through the balls of the ball screw, the ball screw being configured to be driven by the electric motor, and wherein the electric ball screw assemblies are each configured such that when the nut is driven by the electric motor, the threaded shaft is axially moved so as to apply an axial load to the disk portion of the hub ring.

8. The wheel bearing device according to claim 1, wherein each of the camber angle-adjusting linear motion actuators, and the toe angle-adjusting linear motion actuators comprises an electric ball screw assembly including:

an electric motor; and a ball screw including a nut, balls, and a threaded shaft threadedly engaged with the nut through the balls of the ball screw, the ball screw being configured to be driven by the electric motor, and wherein the electric ball screw assemblies are each configured such that when the nut is driven by the electric motor, the threaded shaft is axially moved so as to apply an axial load to the disk portion of the hub ring.

* * * * *